Dec. 12, 1967 P. A. CHOMBARD 3,357,263
ERECTORS OF VERTICAL GYROSCOPES
Filed Aug. 5, 1965 2 Sheets-Sheet 1

Inventor
Pierre Andre Chombard
By
Karl W. Flocks
Attorney

Dec. 12, 1967   P. A. CHOMBARD   3,357,263
ERECTORS OF VERTICAL GYROSCOPES
Filed Aug. 5, 1965   2 Sheets-Sheet 2

Inventor
Pierre André Chombard
By
Karl W. Flocks
Attorney

United States Patent Office 3,357,263
Patented Dec. 12, 1967

3,357,263
ERECTORS OF VERTICAL GYROSCOPES
Pierre Andre Chombard, Boulogne-sur-Seine, France, assignor to Societe Francaise d'Equipements Pour la Navigation Aerienne, Neuilly-sur-Seine, Hauts-de-Seine, France, a joint-stock company
Filed Aug. 5, 1965, Ser. No. 477,552
Claims priority, application France, Sept. 7, 1964, 987,353
3 Claims. (Cl. 74—5.44)

The present invention relates to erectors for vertical gyroscopes of the known type comprising $n$ unstable pendulums ($n$ being greater than or at least equal to 2), articulated about a common axis parallel to the axis of the gyroscope rotor and rigidly fixed to the casing of the rotor, and a device rotating at low speed and in the same direction as the said rotor about the said common axis, and comprising $n$ push-rods for driving the pendulums in the proportion of one push-rod per pendulum, when a pendulum is in contact with its corresponding push-rod.

Erectors of this kind are described in U.S. Patent No. 1,311,768 of Oct. 22, 1918, in the name of John Gray and James Gordon Gray, under the title, "Gyrostatic Apparatus."

When the axis of the gyroscope rotor is vertical or, speaking more generally, parallel to the direction of the resultant field of force of gravity and the accelerations of the carrying vehicle, which direction is known as the apparent vertical, the friction forces applied by each of the unstable pendulums on their common axis keep them in contact with the corresponding push-rod of their driving device.

In other words, the common centre of gravity of the unstable pendulums is located on their common axis, and the pendulums have no effect on the position of the gyroscope.

If the axis of the gyroscope rotor is not vertical, when the component perpendicular to the said axis of the field of force in which each of the pendulums is placed does not keep it in contact with its push-rod, the pendulum falls or abruptly leaves its push-rod and has a tendency to align itself with the said component. Each pendulum thus makes substantially a half-revolution at the constant speed of the driving device, and the half-revolution following at a higher speed under the effect of its fall. The common centre of gravity of the unstable pendulums is thus displaced and applies a couple on the gyroscope which tends to bring the axis of its rotor into the direction of the apparent vertical by a movement of precession.

This movement of precession is not meridian; in other words, it does not take place in the most direct sense defined by the plane containing the axis of the rotor and the direction of the field of force.

The present invention has for its object an improvement in the erector system which eliminates or considerably reduces this drawback, thus improving the law of erection of erectors with unstable pendulums.

The present improvement is essentially characterized by the fact that, on the one hand, each pendulum can rotate about an individual shaft parallel to the axis of the rotor and rigidly fixed to the driving device, the said individual shafts being arranged at equal distances from each other on a circumference centered on the axis of the driving device, and on the other hand, that the driving device comprises one stop per unstable pendulum so as to limit the movement of the said pendulum, the said stop being arranged, like the said push-rods, along a circle centered on the axis of the said device.

Whereas in the known system of erection as described above there is utilized solely the varying movement of the centres of gravity of the pendulums, in the present improvement there is employed in addition the supplementary effect due to the movement of the centre of gravity of the pendulums towards the axis of the erector. This supplementary effect enables the law of erection to be improved and in addition diminishes the mass of the pendulums, which improves the behaviour of the equipment when it has to withstand, as is the case on aircraft, accelerations of large amplitude.

The present invention is described below by way of example within the framework of an erection device for a vertical gyroscope in which the axis of the erection device is coincident with the axis of rotation of the rotor, which condition is furthermore not essential.

The description which follows below is given with reference to the accompanying drawings, in which.

Figure 1:
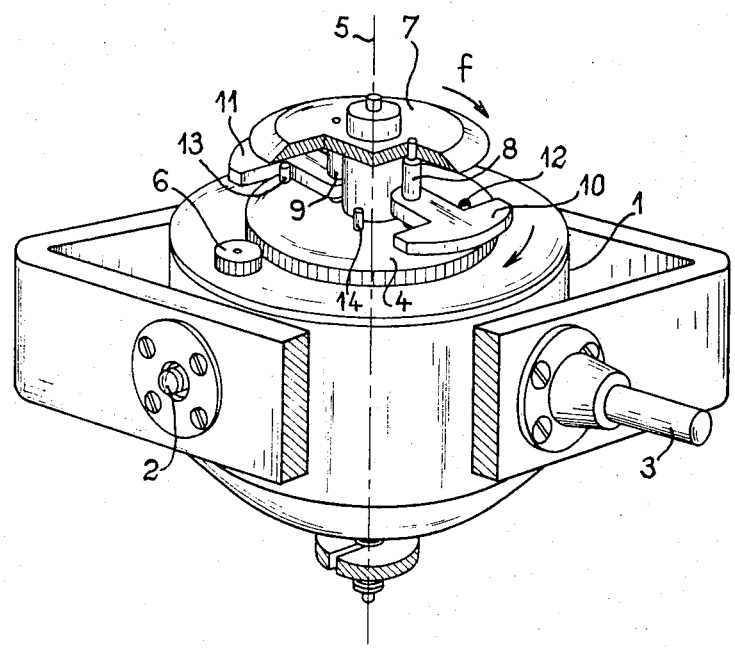
FIG. 1 is a perspective view showing a vertical gyroscope equipped with an erection device having two unstable pendulums according to the invention, in a position in which the two said pendulums are in contact with their push-rods.
Figure 2:
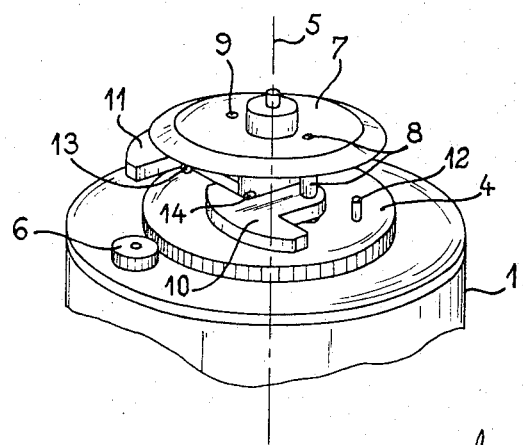
FIG. 2 is a perspective view of the visible portion of the erection device in accordance with FIG. 1, one of the two pendulums having left its push-rod and pivoted about its axis, the other pendulum being in contact with its push-rod.

The improved erection device in accordance with the invention, shown in FIG. 1 and 2 with the vertical gyroscope 1 mounted with a Cardan suspension round the shafts 2 and 3 in a conventional manner, comprises a driving plate 4, coaxial with the shaft 5 of the rotor, toothed externally and engaging with the end pinion 6 of a step-down train of gears (not shown) housed in the gyroscope casing 1 and driven by the shaft of the rotor. The gear train is such that the rotor rotates for example at 23,000 r.p.m., while the erection device rotates at 32 r.p.m.

The present erection device is completed by another plate 7, parallel to the plate 4, these two plates being keyed on the same shaft coaxial with the rotor shaft. The two plates 4 and 7 also comprise two spacing members 8 and 9 which constitute shafts about which are pivoted respectively the pendulums 10 and 11, these two shafts being symmetrical with each other with respect to the shaft 5 of the rotor, to which they are parallel.

The lower plate 4 carries two push-rods 12 and 13 and two stops 14 and 15, the latter not being visible in FIGS. 1 and 2, the push-rods on the one hand and the stops on the other being symmetrical with each other and with respect to the shaft 5 of the rotor.

The operation of the improved erection system according to the invention is particularly shown in diagrams 3 to 6.

With the known erection system having unstable pendulums, the centres of gravity of the pendulums move along the circle 20 in broken lines, and it is their varied movement which, as has previously been stated, causes a movement of precession of the rotor which tends to align its axis with the apparent vertical, or in other words places the unstable pendulums in a plane perpendicular to this apparent vertical.

Figures 3, 4:
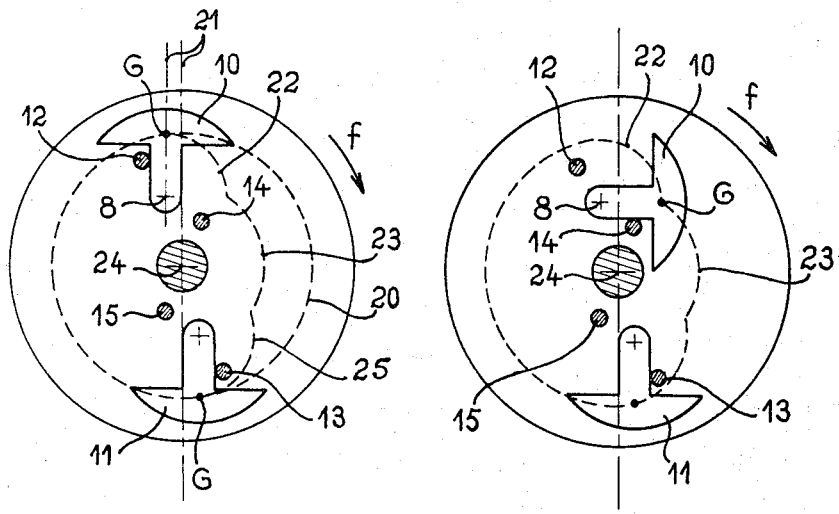
FIGS. 3, 4, 5 and 6 are diagrams showing respectively the two unstable pendulums when one of them is on the point of leaving its push-rod, has come into contact with its stop, is on the point of leaving its stop, and rotates freely about its axis, the other pendulum remaining in contact with its corresponding push-rod for the same period of time.

Assuming that in FIG. 3 the shaft 5 of the rotor of the improved gyroscope 1 according to the invention, is inclined in such manner that the unstable pendulum 10 is orientated parallel to the line 21 of greatest slope of the lower plate 4 and at a level higher than that of the other pendulum 11, and that the plate rotates in the direction of the arrow f, the pendulum leaves its push-rod 12 when the plate 4 continues to rotate and falls under its own weight, pivoting about its shaft 8, so as to come into contact with the stop 14 in the position shown in FIG. 4, its centre of gravity G having described the circular arc 22.

At the same time, the diametrically-opposite pendulum 11 has come into contact with its push-rod 13 and this contact will be maintained until it comes to the position occupied by the pendulum 10 in FIG. 3.

Figures 5, 6:
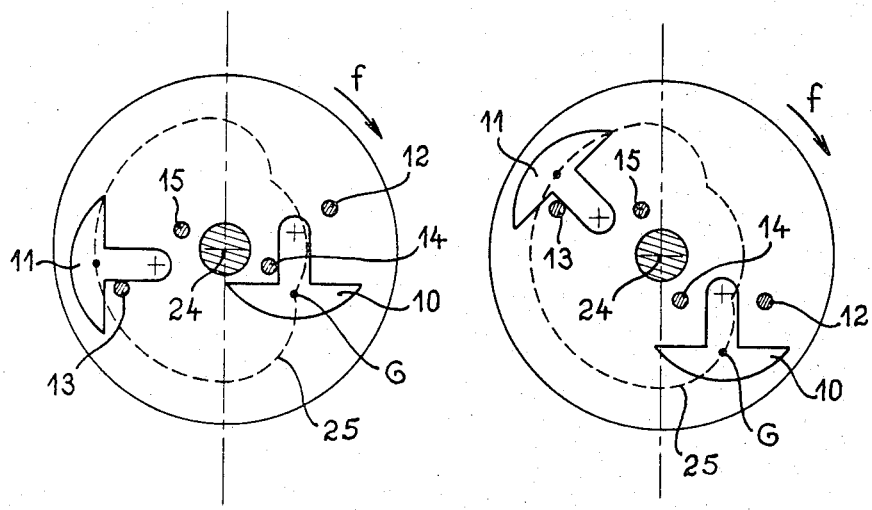

From the position shown in FIG. 4 onwards, the driving plate 4 continuing to rotate, the pendulum 10 remains in contact with its stop 14 and its centre of gravity G describes the circular arc 23, centered on the mark 24 of the axis of the rotor in the plane of the drawing, until the plate 4 reaches the position shown in FIG. 5, at which the plane containing the axis of rotation of the pendulum 10 and its centre of gravity G is parallel to the line 21 having the greatest slope.

FIG. 6 shows the pendulum 10 orientated along the line 21 of the greatest slope, until it comes into the position occupied by the other pendulum 11 in FIG. 3. The centre of gravity G has described the circular arc 25 without there being any contact between the pendulum 10 and its push-rod 12 and its abutment 14 before the position of the pendulum 11 shown in FIG. 3.

From this position onwards, the same operations are repeated, the two pendulums replacing each other for the following half-revolution, and so on.

Finally, the improvement according to the invention consists of the fact that the movement of the centre of gravity G of each of the pendulums 10 and 11 is no longer carried out constantly along the circle 20, but successively and during one half-revolution of the driving device, along the circular arcs 22, 23 and 25, closer to the axis 5 of the rotor than the half-circle 20, the erection law of the gyroscope being thereby improved and the effectiveness of the pendulums increased.

It will of course be understood that the present invention has only been described and shown by way of explanation and not in any limitative sense, and that it is possible to introduce into it modifications of detail, without thereby departing from its scope.

I claim:

1. In an erector of a vertical gyroscope of the kind comprising at least two unstable pendulums arranged about a common shaft parallel to the spin axis of the rotor of said gyroscope, said shaft being rigidly fixed to the casing of said rotor, and a driving device rotating at low speed and in the same direction as said rotor about said common shaft, said driving device comprising a plurality of push-rods, one per unstable pendulum, adapted to drive said pendulums in rotation with said device, said push-rods being symmetrically disposed about said common shaft, the improvement in which each said pendulum is pivoted about an individual shaft whose axis is parallel to the spin axis of said rotor, said shaft being rigidly fixed to said driving device, and in which said driving device further comprises one stop member per unstable pendulum, said member being adapted to limit the pivotal movement of its associated pendulum about its individual shaft.

2. An erector of a vertical gyroscope as claimed in claim 1, in which the individual pivotal shafts of said unstable pendulums are disposed symmetrically about the rotational axis of said driving device.

3. An erector of a vertical gyroscope as claimed in claim 1, in which said stop members are symmetrically disposed about the rotational axis of said driving device.

References Cited

UNITED STATES PATENTS

| 1,311,768 | 7/1919 | Gray | 74—5.44 |
| 2,351,619 | 6/1944 | Kimball | 74—5.44 |

FRED C. MATTERN, JR., *Primary Examiner.*

J. D. PUFFER, C. J. HUSAR, *Assistant Examiners.*